United States Patent [19]
Yano et al.

[11] 4,139,275
[45] Feb. 13, 1979

[54] ELECTROCHROMIC DISPLAY

[75] Inventors: Kozo Yano; Yasuhiko Inami, both of Tenri; Hisashi Uede, Wakayama, all of Japan

[73] Assignee: Sharp Kabushiki Kaisha, Osaka, Japan

[21] Appl. No.: 773,774

[22] Filed: Mar. 2, 1977

[30] Foreign Application Priority Data

Mar. 2, 1976 [JP] Japan .................. 51/22969
Apr. 20, 1976 [JP] Japan .................. 51/45227

[51] Int. Cl.² ............................ G02F 1/17; G02F 1/23
[52] U.S. Cl. ................................. 350/357; 252/500; 252/518; 252/408
[58] Field of Search .............. 252/500, 518, 408; 350/357

[56] References Cited

U.S. PATENT DOCUMENTS

| 3,451,741 | 6/1969 | Manos | 252/408 |
|---|---|---|---|
| 3,704,057 | 11/1972 | Beegle | 350/357 |
| 3,708,220 | 1/1973 | Meyers et al. | 350/357 |
| 3,807,832 | 4/1974 | Castellion | 350/357 |
| 3,827,784 | 8/1974 | Giglia et al. | 350/357 |
| 3,839,857 | 10/1974 | Berets et al. | 350/357 |
| 3,879,108 | 4/1975 | Berets | 350/357 |
| 4,006,966 | 2/1977 | Meyers et al. | 350/357 |

Primary Examiner—Benjamin R. Padgett
Assistant Examiner—T. S. Gron
Attorney, Agent, or Firm—Birch, Stewart, Kolasch and Birch

[57] ABSTRACT

In an electro-optic display which utilizes the electrochromism phenomenon of a transition metal oxide, an organic solvent for an electrolyte in contact with the transition metal oxide comprises at least one member selected from the group consisting of ketones represented by the chemical formula of $C_nH_{2n+1}COC_mH_{2m+1}$ wherein $n = 1, 2$ and $m = 2 \sim 4$; alkyl acetates represented by the chemical formula of $CH_3COOC_nH_{2n+1}$ wherein $n = 2, 3$; ethylene glycol monoalkoxy acetates represented by the chemical formula of $CH_3COOCH_2CH_2OC_nH_{2n+1}$ wherein $n = 1, 2$; and diethylene glycol monoalkoxy acetates represented by the chemical formula of $CH_3COOCH_2CH_2OCH_2CH_2OC_nH_{2n+1}$ wherein $n = 1 \sim 4$.

7 Claims, 2 Drawing Figures

ELECTROCHROMIC DISPLAY

BACKGROUND OF THE INVENTION

The present invention concerns a display utilizing the so-called electrochromism phenomenon, that is, one that manifests variations in the light absorption property upon application of properly controlled voltage. This display is referred to hereinafter as an "electrochromic display (ECD)".

A scheme of ECD is as follows. Through an electrolyte providing ion conductivity, an electrochromic material deposited on one transparent electrode, for example, a thin film of a transition metal oxide material, is electrochemically coupled with another electrode. When a thin film of the transition metal oxide material is supplied with a negative potential with respect to a specific potential, the current which flows through the oxide film is seemingly reduced, with the result that the oxide film is switched from a first absorption state to a second absorption state. On the contrary, when a positive potential is applied thereto the film of the transition metal oxide material is returned from the second absorption state to the first absorption state. While the film of the transition metal oxide material placed in the first absorption state does not exhibit absorption within a range of visible light (namely, transparent), the same in the second absorption state does exhibit a variety of absorption properties (namely, the film becomes colored). In the case where the film of the transition metal oxide material consists of an evaporated layer of amorphous tungsten oxide (WO$_3$), the colored states thereof are explained below.

When cations of the electrolyte are a protons (H+),

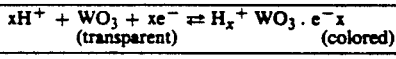
(transparent) (colored)

When the same are metal (M+) alkali metal is conventionally employed,

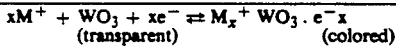
(transparent) (colored)

A typical example of an ECD cell is illustrated in FIG. 1. A counter electrode is denoted as 1. This is made of a transparent indium oxide, electrically conducting film (obtainable through conventional vacuum evaporation method) or a NESA film (SnO$_2$; obtainable through the conventional vacuum evaporation method or the spray method) for the transmission mode. This may be substituted by a layer of noble metal materials such as graphite, platinum and palladium. A substrate 2 may be formed of plastics, metal, ceramics, etc. The ECD cell further comprises a spacer and sealant resin 3. The transparent electrode 4 and the layer of the transition metal oxide 6 form in combination, a display electrode bearing a predetermined display pattern. Another transparent subtrate 5 may be made of glass, plastics or the like. A reference electrode 8 is made of the same material as the counter electrode 1. An electrolyte 7 is injected between the pair of the substrates 4 and 5.

The present invention is interested in the electrolyte in the ECD cells using tungsten oxide as the transition metal oxide material.

The prior art electrolytes which have been suggested include: (1) sulfuric acid solution of 1,2,3 propanetriol (for example, U.S. Pat. No. 3,708,220); (2) sulfuric acid solution of water and 1,2-ethanediol (for example, B. W. Faughnan et al., RCA Rev. 36 (4), 177 (1975)); and (3) propylene carbonate (for example, SID 75 Digest, 50, 1975). However, these prior art electrolytes exhibited the following disadvantages.

(1) lithium perchlorate

A glass substrate carrying an In$_2$O$_3$ transparent electrode is heated at 150° C. within a vacuum environment of 5 × 10$^{-4}$. WO$_3$ having a thickness of 5000Å is deposited thereon with the evaporation rate of 10Å/sec. 3.6 Normal sulfuric acid solution of 1,2,3 propanetriol-sulfuric acid is employed as the electrolyte to complete the fabrication of the transparent mode ECD cell. The many characteristics of the electrolyte are evaluated in the following manner.

The response characteristics were examined under the conditions that the display electrode of the ECD cell is grounded and the reference electrode (material: In$_2$O$_3$) is kept at ±1.0V through the use of a constant potential driving technique. The results of the inventors' experiments reveal that the response is very poor and the ECD cell is not recommended as a proper timepiece display because the write response (say, a period of time required for reducing transmittancy from 100% to 30%) is 3.0 sec and the erase response (say, a period of time required for reducing transmittancy from 30% to 90%) is 4.0 sec at a temperature of 25° C. Although the response characteristics may be improved correspondingly with an increase in applied voltage, hydrogen overvoltage of protons is conventionally only 1.5V in a water solution and probably even in a glycerine solution (the inventor's simplified experiments justify such an assumption). For this reason, if a voltage higher than the above named voltage is applied, then hydrogen gas will be produced about the counter electrode, thereby degrading the ECD cell.

(2) Sulfuric acid aqueous solution-ethylene glycol

The electrolyte employed is a mixture of sulfuric acid of 2 Normal concentration into a water solution of ethylene glycol (20%). The ECD cell is completed in the same manner as the above paragraph (1). Similarly, the response characteristics are evaluated when the reference electrode is driven at ±1.0V. The results are that the write response is 0.8 sec and the erase response is 0.4 sec. Therefore, the response characteristics are considerably superior to the above example (1). However, in the case where this system of the ECD cell is allowed to stand for a long time, for example for one day to several days, the WO$_3$ film or the In$_2$O$_3$ electrode tends to dissolve with accompanying degradation in the ECD cell.

(3) Lithium perchlorate, propylene carbonate

A 1.0-molar lithium perchlorate solution of propylen carbonate is used as the electrolyte. Since the redox potential of lithium ions (Li+) is about 3.0V, such a system of this electrolyte has the advantage that higher voltages are applicable in driving the ECD cell. When the reference electrode is a constant potential driven at ±1.5V, the write response is 0.6 sec and the erase response is 0.6 sec at 25° C. Similarly, the WO$_3$ film with a thickness of 5000Å tends to dissolve in several days. In the event that sodium tungstate is previously saturated within the electrolyte, the operating life will be extended for an additional several days. Anyway, the operating life is at most 13 or 14 days.

SUMMARY OF THE INVENTION

Accordingly, it is an object of the present invention to provide and ECD cell having quick response and long operating life.

In accordance with the teachings of the present invention, a solvent for an electrolyte in an ECD cell is employed which does not dissolve tungsten oxide. This solvent has the properties of dissolving and ionizing a supporting electrolyte such as lithium perchloride and provides electrical conductivity which is tolerable during operation of an ECD cell (say, higher than $10^{-4}$ U. $cm^{-1}$). In addition, the solvent shows no absorption within the range of visible light.

concentration when lithium perchlorate is not completely dissolved) and the response characteristics when the reference electrode of an ECD cell is driven with $\pm 1.5V$ through a constant potential driving technique.

In order to examine the solubility of an evaporated tungsten oxide film into the respective solvents, tungsten oxide of 5000Å thick is deposited on a transparent conducting film (evaporated indium oxide). The quantity of the solvents is weighed so carefully that the concentration of 200 ppm is developed when the $WO_3$ film is completely dissolved. Samples of the $WO_3$ film are dipped for 90 days at room temperature. The dissolved $WO_3$ is evaluated by elemental analysis (Jarrell Ash Co. Ltd. Model AA-780) as follows.

Table 1

| Solvent | Concentration | Conductivity[*1] $\times 10^{-3}$ ($v \cdot cm^{-1}$) | Response [*1, *2] (sec) Write | Erase | Solubility (ppm) |
|---|---|---|---|---|---|
| Ketones | | | | | |
| Acetone | 1.0M | 29.4 | 0.3 | 0.15 | 0 |
| Ethyl methyl ketone | " | 17.6 | 0.4 | 0.2 | 0 |
| Diethyl ketone | Saturated | 4.3 | 0.7 | 0.5 | 0 |
| Methyl propyl ketone | 1.0M | 11.4 | 0.6 | 0.5 | 0 |
| Acetates | | | | | |
| Ethyl acetate | 1.0M | 11.4 | 0.6 | 0.2 | 0 |
| 2-ethoxy ethyl acetate | " | 2.96 | 1.0 | 0.4 | 7 |
| Diethylene glycol monoethyl ether acetate | 1.0M | 1.63 | 1.5 | 0.7 | 0 |
| Diethylene glycol monobutyl ether acetate | " | 0.568 | 10 | 4.0 | 0 |
| i-propyl acetate | Saturated | 0.495 | 2.1 | 0.8 | 0 |
| n-propyl acetate | " | 0.323 | 3.3 | 1.8 | 0 |
| Alcohols | | | | | |
| Methanol | 1.0M | 27.0 | 0.5 | 0.2 | 90 [*4] |
| Ethanol | " | 15.6 | 0.5 | −.4 | 30 [*4] |
| i-propanol | " | 6.25 | 0.8 | −.35 | 0 |
| n-propanol | " | 5.56 | 0.9 | 0.5 | 0 |
| n-butanol | Saturated | 2.86 | 1.2 | 0.5 | 6 |
| sec-butanol | Saturated [*3] | 2.38 | 1.3 | 0.8 | 19 [*4] |
| Ethylene glycol | 1.0M | 4.17 | 1.2 | 0.5 | 45 [*4] |
| Ethers | | | | | |
| Ethylene glycol Monomethyl ether | 1.0M | 8.62 | 0.7 | 0.15 | 146 |
| Ethylene glycol Dimethyl ether | " | 11.8 | 1.2 | 0.4 | 65 |
| Ethylene glycol Monoethyl ether | " | 4.35 | 1.0 | 0.3 | 83 |
| Other | | | | | |
| Acetonitride | 1.0M | 71.4 | 0.3 | 0.2 | 85 [*4] |
| N-methyl formamide | " | 18.2 | 0.4 | 0.7 | 100 [*4] |
| Dimethyl formamide | " | 11.0 | 0.6 | 0.7 | 40 [*4] |
| Propylene carbonate | 1.0M | 7.30 | 0.6 | 0.6 | 35 |
| r-butyrolactone | " | 12.8 | 0.3 | 0.5 | 50 [*4] |
| Dioxane | " | 2.92 | 2.1 | 2.0 | 30 [*4] |

[*1] Conductivity and response are measured at 25° C.
[*2] Response initial value reference electrode voltage 1.5V transmittancy (Ts) write: 100% → 30% erase: 30% → 90%
[*3] Concentration 0.5M/l ~ 1.0M/l
[*4] Solubility value for 20 days. Others are values for 90 days.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

Table 1 sets forth the electrical conductivities of the solvents of the present invention containing dissolved lithium perchlorate with 1.0 M/l (or with saturated Analysis of Table 1 shows that the evaporated tungsten oxide film manifests excellent resistance to ketone and acetate solvents. Because in the inventors' experiments errors as to the tungsten concentration are estimated at about 10 ppm, 7 ppm for 2-ethoxy ethyl acetate is placed within allowance of errors.

The above description is for a transmission mode ECD cell. It is however conventional in the art that a specific background is given to the ECD cell. In other words, a reflective mode ECD cell is more effective and practical than the transmission mode cell.

Figure 1:
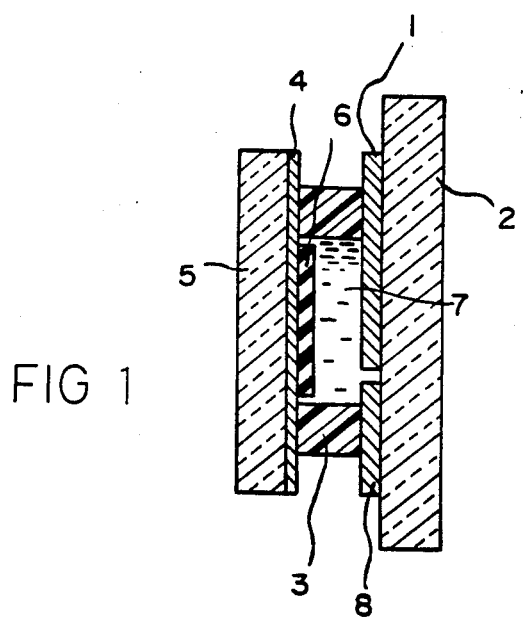
FIG. 1 is a cross sectional view of a transmission-mode electrochromic display device.
Figure 2:
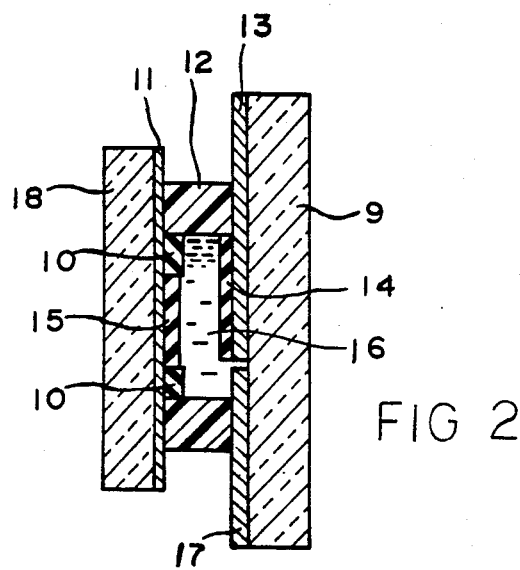
FIG. 2 is a cross sectional view of a reflection-mode electrochromic display device.

FIG. 2 illustrates a reflective ECD cell embodying the present invention. A pair of glass substrates is denoted as 9 and 18. The cell comprises a vacuum-evaporated $SiO_2$ film 10, an $In_2O_3$ film 11 and a $WO_3$ film 15 to form a display electrode. A spacer and sealant resin material 12 has the thickness of 1mm (Somal Kogyo KK R2401 HC-11). A layer of $In_2O_3$ 13 is deposited and then a layer of $WO_3$ 14 is deposited through a vacuum deposition method, thereby forming a counter electrode in combination. A reference electrode 17 is a film of $In_2O_3$. An electrolytic 16 is injected.

As stated above, the present invention concerns the electrolyte. More detailed embodiments are discussed below. A way to provide a white background for the ECD cell is to mix barium sulfate fine powders into the electrolyte.

The fabrication of the white background electrolyte is carried out in the following manner. 100 grams of ethyl methyl ketone (Kishida Chemical Co. G.R.) with lithium perchlorate (Kishida Chemical Co. E.P.) of 1.0 M/l concentration and 100–150 grams of barium sulfate powders (Takeda Chemical Industries, Ltd.) are fully mixed within a mortar to obtain white paste material.

The reflective ECD cell is completed by injecting the above discussed white paste electrolyte into the interior of the cell through an injector and sealing the same with epoxy resin (Konishi Co., Ltd. quick set). The resulting cell shows a reflection factor of 65% for standard white magnesium oxide with a measuring aid of a spectrophotometer (Shimazu Co. model UV-2000). In case where the transmissive ECD cell employing the electrolyte of combined lithium perchlorate and ethyl methyl ketone is remodelled into the reflective cell by using qualitative filter paper (Top-Rosi Co. Ltd. No.2), the reflection factor assumes 58% and thus the white paste reflection layer is very effective. Also, barium sulfate bears neither toxicity nor discoloration. Whiteness of barium sulfate is better than $TiO_2$. The following sets forth conditions of the $WO_3$ film or the counter electrode. The purposes of the $WO_3$ film are to facilitate charge exchange when driving the ECD cell and to reduce voltage to be applied to the counter electrode. For a typical cell wherein a ratio of area of the display electrode to that of the counter electrode is 1:16, the potentials of the counter electrode are listed in Table 2 together with the results of the aging test when the constant potential technique is utilized ($\pm 1.5V$ for $In_2O_3$ reference electrode).

Table 2

Types of Counter Electrode and Reliability

| Counter electrode | Counter electrode potential | | Aging test |
|---|---|---|---|
| | Write | Erase | |
| $In_2O_3$ | 3.0V | 3.5V | Damaged after 30000 times. |
| $In_2O_3$ + $WO_3$ | 1.7V | 2.0V | Not damaged even after 2 million times. |

It is obvious from Table 2 that, when the $WO_3$ film is employed as the counter electrode, the applied voltage is relatively reduced as compared with the $I_{n2}O_3$ electrode, for example, 1.3V for write mode and 1.5V for erase mode, thereby reducing power consumption. Moreover, the results of the aging test are largely enhanced. The fabrication of low power consumption, high reliability ECD cells is attained by using the electrolyte of the present invention, the reflection layer of barium sulfate, and the counter electrode of $WO_3$ deposited on $In_2O_3$ electrode.

Detailed study of the electrolyte in the ECD cell is facilitated by constituting the reflective cell which employs $WO_3$ film as the counter electrode (for the transmissive cell, only $In_2O_3$ or $SnO_2$ is well known as transparent counter electrode material and both of them are electrochemically degraded to thereby render detailed study of the electrolyte through long time aging impossible).

The reflective cell is thus fabricated by using the favorable electrolytes listed in Table 1. The aging results of the reflective cell are summarized in Table 3.

Table 3

| Solvent | Paste Electrolyte | | | | | |
|---|---|---|---|---|---|---|
| | Reference electrode voltage (write)*3 | Barium sulfate concentration (V1O/O) | Aging cycle number *4 | Inequality of chromism *5 | Reversibility of chromism *6 | Degraded state |
| Ethyl methyl ketone | 0.8V | 20 | $3 \times 10^6$ | Present | Good | Advance of inequality of chromism |
| 2-ethoxy ethyl acetate | 1.0 | 30 | $5 \times 10^6$ | Absent | " | No |
| Diethylene glycol monoethyl ether acetate | 1.2 | 30 | $5 \times 10^6$ | " | " | " |
| Diethylene glycol monobutyl ether acetate | 1.3 | 30 | $5 \times 10^6$ | " | " | " |
| i-propanol | 1.0 | 20 | $2 \times 10^6$ | Present | " | No transmittancy |
| Propylene carbonate | 0.9 | 50 | $1 \times 10^6$ | " | Incomplete | " |

*1 Electrolyte 1.9M/l, $LiClO_4$ All electrolytes are saturated with $NaWO_3$.
*2 Barium sulfate concentration Viscosity of paste electrolyte is fixed.
*3 Reference electrode voltage
Write: Voltage is so selected as to assume charge amplitude of 10mc/cm² at 500 msec. With such charge amplitude, contrast ratio of ECD measured by the above identified spectrophotometer is 10:1. Erase: 1.5V.
*4 Aging cycle: One for two sec. ON.OFF.
*5 Inequality of chromism:
This means that overlapped areas of counter electrode and display electrode become colored.
*6 Reversibility of chromism:
Reversibility for one sec at the above voltage. Incomplete means that is confirmed by human eye during erase mode.

In Table 3, non-equality of chromism is developed when the counter electrode is shifted with respect to the display electrode. Therefore, such equality can be avoided easily in design for example by enhancing the positioning accuracy. This can never be a fatal defect.

Although a number of poor response solvents are listed in Table 1, the response characteristics are improved by adoption of the tungsten oxide counter electrode. In addition, it is found that operating life of the ECD cell is increased by the electrolyte saturated with $NaWO_3$.

It is concluded that the following acetate solvents are recommended as favorable solvents for the electrolyte in the ECD cell.

| | | |
|---|---|---|
| (1) | Chemical formula Ketones | $C_nH_{2n+1}COC_mH_{2m+1}$ (n = 1,2, m = 2 ~ 4) |
| (2) | Chemical formula Alkyl acetates | $CH_3COOC_nH_{2n+1}$ (n = 2,3) |
| (3) | Chemical formula Ethylene glycol monoalkoxy acetates | $CH_3COOCH_2CH_2OC_nH_{2n+1}$ (n = 1,2) |
| (4) | Chemical formula diethylene glycol monoalkoxy acetates | $CH_3COOCH_2CH_2OCH_2CH_2OC_nH_{2n+1}$ (n = 1,2,3,4) |

It will be noted that the solvents with large carbon number are not proper for the electrolyte because of their high resistance.

While particular representative embodiments and details have been shown for the purpose of those skilled in this art that various changes and modifications may be made without departing from the spirit or scope of the invention. Accordingly, the foregoing embodiments are not to be taken as delimiting examples but as exemplary structures of the invention defined in the claims.

We claim:

1. An electrochromic display comprising an electrochromic transition metal oxide said electrochromic display deposited on a transparent display electrode, and a counter electrode, containing an electrolyte in solution in an organic solvent, which solution is in contact with the transition metal oxide, said organic solvent comprising at least one member selected from the group consisting of ketones represented by the chemical formula $C_nH_{2n+1}COC_mH_{2m+1}$ wherein n = 1, 2 and m = 2 ~ 4; alkyl acetates represented by the chemical formula of $CH_3COOC_mH_{2m+1}$ wherein m = 2, 3; ethylene glycol monoalkoxy acetates represented by the chemical formula of $CH_3COOCH_2CH_2OC_nH_{2n+1}$ wherein n = 1, 2; and diethylene glycol monoalkoxy acetates represented by the chemical formula of $CH_3COOCH_2CH_2OCH_2CH_2OC_nH_{2n+1}$ wherein n = 1 ~ 4.

2. An electrochromic display as defined in claim 1 wherein the transition metal oxide is tungsten oxide.

3. The electrochromic display as defined in claim 1 wherein the transition metal oxide deposited on the transparent display electrode comprises tungsten oxide deposited on an indium oxide film and the counter electrode comprises a transparent film of indium oxide.

4. A reflective electrochromic display cell comprising an electrochromic transition metal oxide deposited on a transparent display electrode, and a counter electrode, said electrodes defining therebetween reflective, white background electrolyte paste, said electrolyte paste containing a mixture of an electrolyte in solution in an organic solvent and an inorganic white powder, said organic solvent comprising at least one member selected from the group consisting of ketones represented by the chemical formula of $C_nH_{2n+1}COC_mH_{2m+1}$ wherein n = 1, 2 and m = 2 ~ 4; alkyl acetates represented by the chemical formula $CH_3COOC_mH_{2m+1}$ wherein m = 2, 3; ethylene glycol monoalkoxy acetates represented by the chemical formula of $CH_3COOCH_2CH_2OC_nH_{2n+1}$ wherein n = 1, 2; and diethylene glycol monoalkoxy acetates represented by the chemical formula of $CH_3COOCH_2CH_2OCH_2CH_2OC_nH_{2n+1}$ wherein n = 1 ~ 4.

5. The reflective electrochromic display cell of claim 4, wherein the electrolyte is lithium perchlorate and the inorganic white powder is barium sulfate.

6. The reflective electrochromic display cell of claim 4, wherein both the electrochromic transition metal oxide deposited on the transparent display electrode and the counter electrode comprise an electrochromic transition metal oxide film deposited on a film of transparent transition metal oxide.

7. The reflective electrochromic display cell of claim 6, wherein both the electrochromic transition metal oxide deposited on the display electrode and the counter electrode comprise a tungsten oxide film deposited on a film of indium oxide.

* * * * *